(12) United States Patent
Maung

(10) Patent No.: US 6,575,186 B2
(45) Date of Patent: Jun. 10, 2003

(54) MULTIPLE SPEED SLIT VALVE CONTROLLER

(75) Inventor: Myo Myint Maung, Singapore (SG)

(73) Assignee: Chartered Semiconductor Manufacturing Ltd., Singapore (SG)

(*) Notice: Subject to any disclaimer, the term of this patent is extended or adjusted under 35 U.S.C. 154(b) by 81 days.

(21) Appl. No.: 09/760,369

(22) Filed: Jan. 16, 2001

(65) Prior Publication Data
US 2002/0092569 A1 Jul. 18, 2002

(51) Int. Cl.[7] ................................................ F16K 31/12
(52) U.S. Cl. ............................ 137/1; 91/405; 251/30.05
(58) Field of Search ............................. 91/405; 137/1; 251/30.05

(56) References Cited

U.S. PATENT DOCUMENTS

| | | | |
|---|---|---|---|
| 4,692,115 A | 9/1987 | Aldridge et al. | 432/242 |
| 5,054,988 A | 10/1991 | Shiraiwa | 414/404 |
| 5,363,872 A * | 11/1994 | Lorimer | 137/1 |
| 5,706,713 A * | 1/1998 | Lim | 91/405 |
| 6,032,419 A * | 3/2000 | Hurwitt | 137/1 |
| 6,042,623 A | 3/2000 | Edwards | 29/25.01 |
| 6,071,055 A | 6/2000 | Tepman | 414/217 |

FOREIGN PATENT DOCUMENTS

DE 29 08 583 A1 * 9/1980 ............ 91/405

* cited by examiner

Primary Examiner—Gerald A. Michalsky
(74) Attorney, Agent, or Firm—George O. Saile; Rosemary L. S. Pike

(57) ABSTRACT

Described is a system designed to control the slit valve used to isolate chambers in cluster tools used in integrated circuit (IC) fabrication. This method changes the slit valve door actuator pneumatic pressure and movement during the closing sequence. As the door nears the fully closed position, its speed is reduced. This results in a soft touch landing or seating of the door and reduces the number of particles generated over systems incorporating higher pressure in the door closure. Once the door is seated in a fully closed position, higher pressure is applied to maintain a tight seal between chambers. By reducing the particles generated, the overall IC yield for both production and test wafer lots will improve. Reducing wear on the door and door seat, fewer parts such as the door, door seat and slit valve O-ring are consumed, and both scheduled and unscheduled maitenance times are shortened.

24 Claims, 4 Drawing Sheets

MULTIPLE SPEED SLIT VALVE CONTROLLER

BACKGROUND OF THE INVENTION (1) Field of the Invention

The invention generally relates to a method and apparatus used in semiconductor manufacturing and, more particularly, to a valve used to isolate individual chambers in vacuum pressure cluster tools in the fabrication of integrated circuits.

(2) Description of Prior Art

Multiple chambered cluster tools have become generally accepted as an efficient means to process semiconductor wafers. The cluster tools allow several steps to be performed on a wafer without the necessity of moving the wafers into and out of a vacuum environment. Wafers are moved between a plurality of process chambers via a central transfer chamber within the vacuum environment. Each process chamber is isolated from the transfer chamber by means of a slit valve. The slit valve door is opened while the wafer is moved between the transfer and process chambers and closed during wafer processing.

Referring now to FIG. 1 depicting schematically a top view of a typical cluster tool, the Endura (5500) system. Robot wafer handlers 12, housed within the transfer chamber 10 and buffer chamber 11, allow wafers 14 to be rotated about the center of each chamber and moved radially into one of a plurality of chambers 16a–16j through slit valves 18a–18l.

The slit valves 18 currently in use employ high pneumatic pressure to seal the wafer ports and isolate the process chambers 16 from the transfer chamber 10 or buffer chamber 11. The door of the slit valve 18 is typically composed of aluminum, while the seat for the door is typically composed of stainless steel. The high pressure used to close and seal the door results in contact between the door and seat thereby generating both aluminum and stainless steel particles. These particles may land upon the wafers being processed causing a reduction in the yield of the integrated circuits (ICs) being produced. Wear on the door and seat results in the need for their replacement. This replacement requires that the cluster tool be out of service for more than twelve hours. In addition, this high-pressure closure causes premature failure of an o-ring used on the slit valve 18. This o-ring is typically replaced as part of a preventative maintenance procedure based upon known o-ring life.

Other approaches for improving wafer-handling equipment exist. U.S. Pat. No. 4,692,115 to Aldridge et al. teaches a system for loading and unloading wafer-carrying boats into a thermal furnace that allows a soft wafer landing thereby reducing the particles generated. This system includes a door used to seal the furnace employing a multi-step opening procedure. U.S. Pat. No. 5,054,988 to Shiraiwa teaches a method for transferring wafers between cassettes and boats where dust created by the transfer mechanism is minimized. U.S. Pat. No. 6,042,623 to Edwards and U.S. Pat. No. 6,071,055 to Tepman describe systems for moving wafers into and out of a vacuum environment where throughputs are improved and pump-down times are reduced.

SUMMARY OF THE INVENTION

A principal object of the present invention is to provide a method that reduces the number of particles generated when closing the slit valve door.

Another object of the present invention is to provide a method that reduces the number of particles generated when closing the slit valve door and thereby improves the yield of finished integrated circuit (IC) die.

Another object of the present invention is to provide a method that reduces downtime for both scheduled and unscheduled maintenance on the slit valve door and seat.

Another object of the present invention is to provide a method that reduces consumable part usage by decreasing wear on the slit valve door and seat.

Another object of the present invention is to provide a method that improves the IC yield by reducing the generation of particles caused by the closing of the slit valve door and thereby requires fewer wafers in a test lot.

These objects are achieved using a system designed to control the slit valve door actuator pneumatic pressure and movement during the closing sequence thereby resulting in a soft touch landing. During the closing sequence, the slit valve door will begin closing at full pressure. When the door is nearly closed, a speed change sensor activates a circuit designed to reduce the closing pressure resulting in a soft touch landing. Once the door reaches the closed position, the full pressure is then reapplied to provide a proper vacuum seal for the chamber. Full pressure is applied during the door opening sequence.

BRIEF DESCRIPTION OF THE DRAWINGS

In the accompanying drawings forming a material part of this description, there is shown.

DESCRIPTION OF THE PREFERRED EMBODIMENTS

The present invention uses a system designed to control the slit valve door actuator pneumatic pressure and movement during the closing sequence. Initially, during the closing sequence the slit valve door will begin closing at full pressure and speed. Just before the door nears the fully closed position, a speed change sensor activates a circuit designed to reduce the closing pressure. This results in a soft touch landing or seating of the door and reduces the particles generated over systems incorporating one pressure in the door closure. When the door is seated in the closed position, the full pressure is then reapplied thereby providing a proper vacuum seal for the chamber. Full pressure is applied to the door during the opening sequence.

Figure 1:
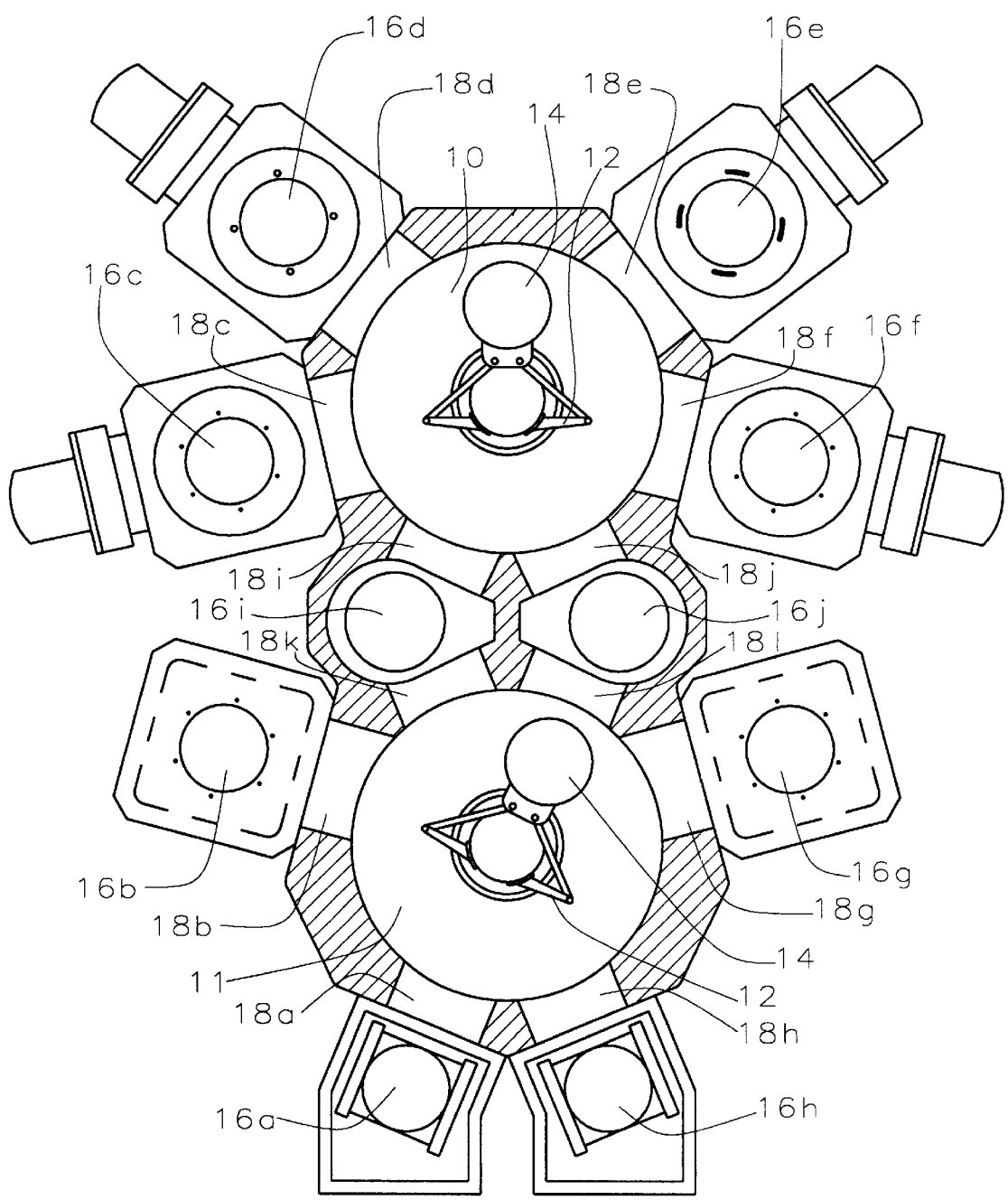
FIG. 1 schematically illustrating prior art for a cluster tool.
Figure 2A:
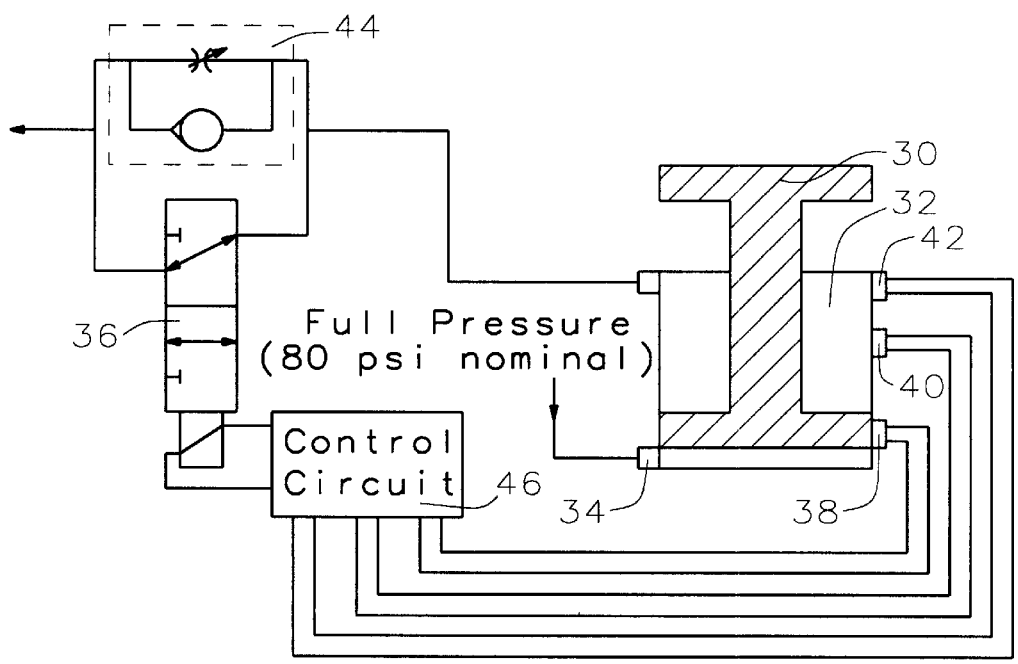
FIGS. 2A through 2C schematically showing the pneumatic network of the present invention.
Figure 2B:
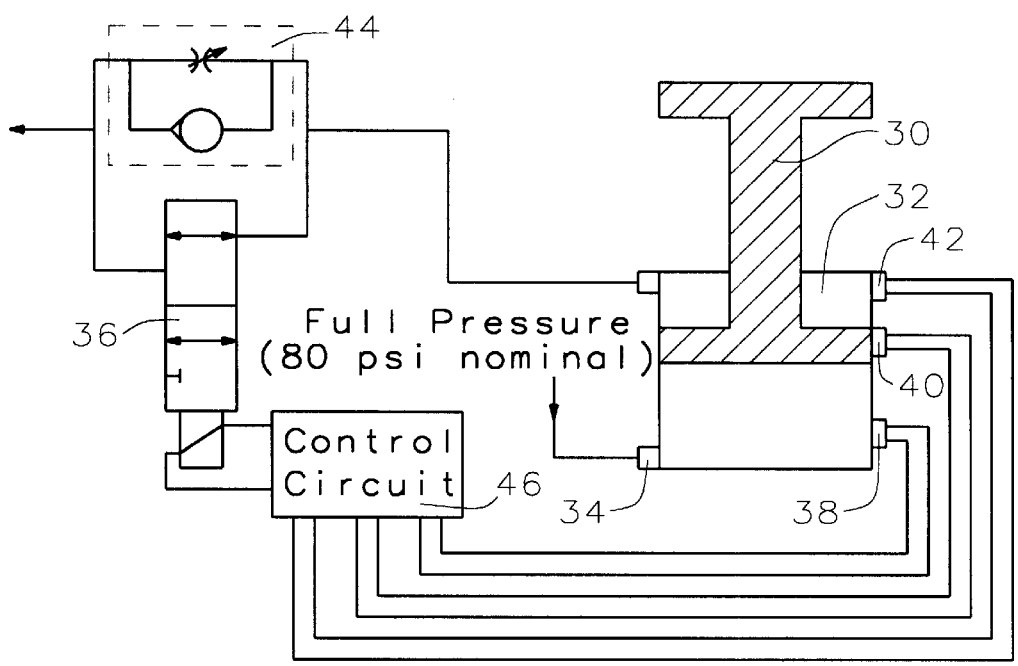

Referring to FIG. 2, one embodiment of the system is show. Referring more particularly to FIG. 2A, the door 30 is shown in an open position. Slit valve open sensor 38 which may be a reed switch, for example, is activated. As the closing sequence begins, a pressure of between about 70 to 95 psi (80 psi nominal) is applied to the door actuator 32. The 3/2 way solenoid valve 36 is set open through the control circuit 46 allowing the full pressure to be applied to the door 30. The door 30 quickly begins closing until it reaches a position where it is nearly closed as shown in FIG. 2B.

Referring now to FIG. 2B, slit valve speed change sensor 40 which may be a reed switch, for example, is activated. The control circuit 46 causes solenoid valve 36 to close and the pressure applied to the door actuator 32 is reduced by the pneumatic speed controller 44. When open, the solenoid valve 36 functions as a bypass for the pneumatic controller 44. The reduced pressure level is adjustable using the pneumatic speed controller 44, and is preferably between about 30 to 40 psi. The door 30 closing speed is reduced. The door 30 continues closing until it is seated as shown in FIG. 2C.

Figure 2C:
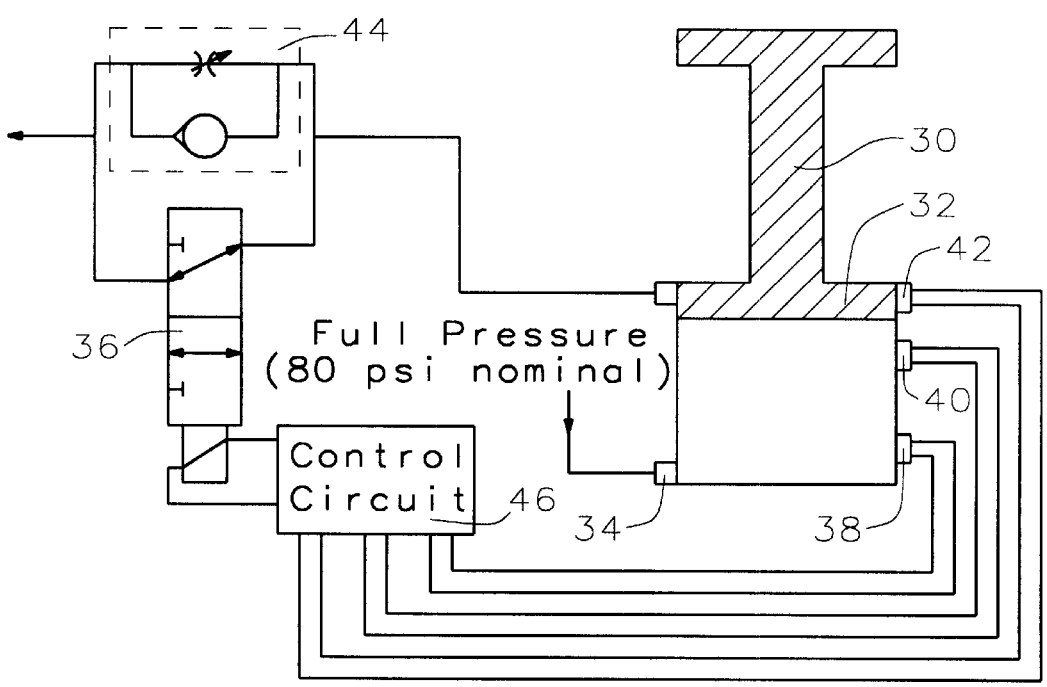

Referring now to FIG. 2C, the slit valve closed sensor 42 which may be a reed switch, for example, is activated. The solenoid valve 36 is again set open though the control circuit 46 allowing the full pressure to be applied to the door actuator 32. This seals the door 30 maintaining a vacuum seal between the chamber (not shown) and mainframe (not shown).

Figure 3:
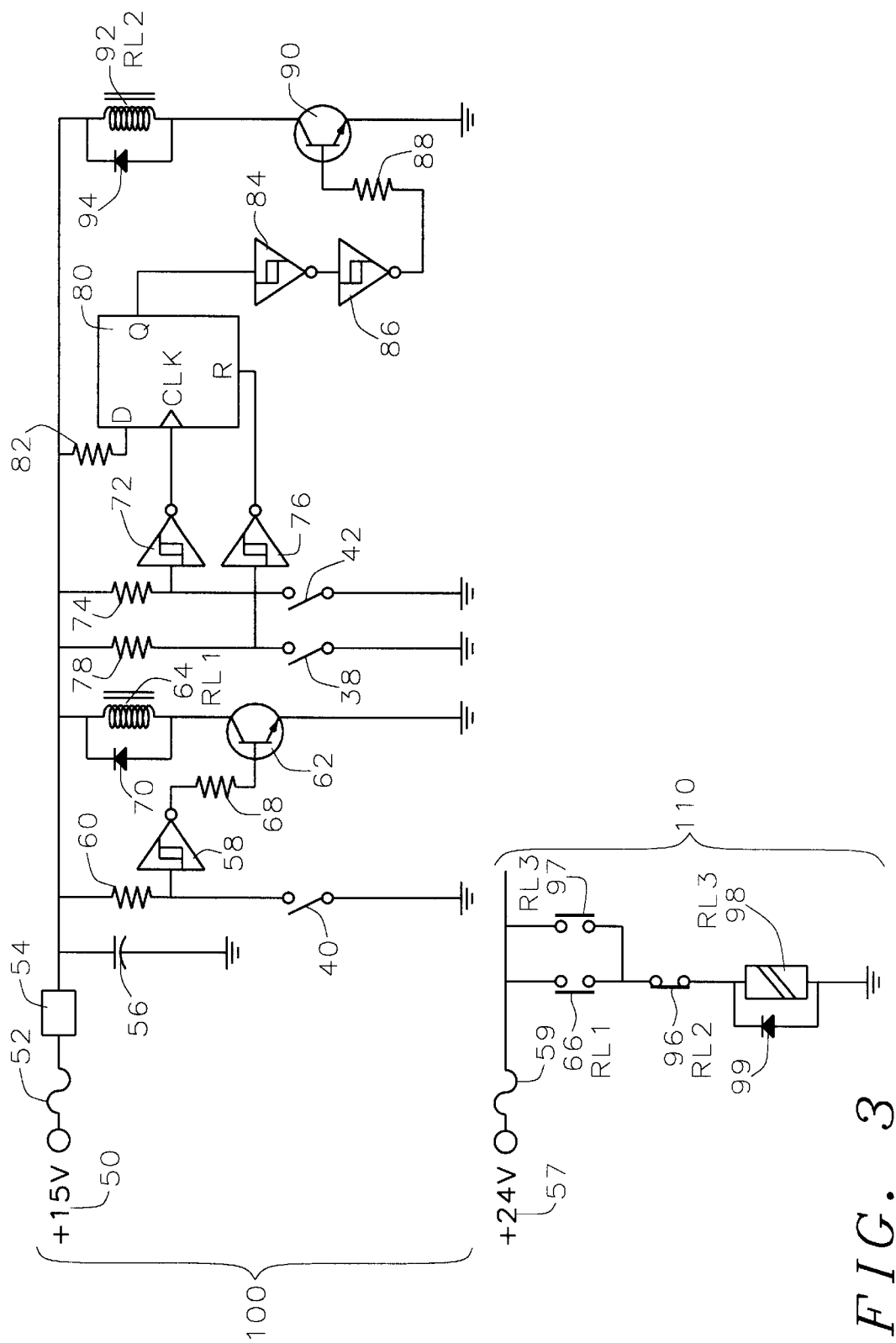
FIG. 3 schematically showing one embodiment of electronic circuit of the present invention.

Referring now to FIG. 3, one embodiment of the control circuit is shown. The electronic circuitry 100 is powered by a 15 VDC source 50 and is protected by a fuse 52, for example. Voltage regulator 54, such as a 7812-12 volt DC regulator, for example, and capacitor 56 eliminate any voltage transients on the voltage supply lines feeding the remainder of the circuit. The solenoid control circuitry 110 is powered by a 24 VDC source 57 protected by a fuse 59.

Referring now to FIGS. 2 and 3, when slit valve speed change sensor 40 is not activated (open), the input to a Schmidt-trigger inverter 58 is pulled high (logic 1) through resistor 60. The output of the inverter 58 will be low (logic 0) and NPN transistor 62 will be off. Relay coil 64 is not energized, so normally open contacts 66 associated with relay coil 64 remain open. When the slit valve speed change sensor 40 is activated (closed), the input to inverter 58 is pulled low (logic 0) by the sensor. The output of the inverter 58 will be high (logic 1). NPN transistor 62 will be on. Relay coil 64 is now energized, so normally open contacts 66 close. If normally closed contacts 96 are closed, solenoid valve actuator coil 98 is energized causing the solenoid valve 36 to close as shown in FIG. 2*b*. As described previously, the pressure applied to the door actuator 32 is then reduced by the pneumatic speed controller 34. Resistor 68 between the output of inverter 58 and the base current of NPN transistor 62 limits the base current. Flyback diode 70 across the relay coil 64 prevents high voltage transients during coil de-energizing.

Referring still to FIGS. 2 and 3, when slit valve closed sensor 42 is not activated (open), the input to a Schmidt-trigger inverter 72 is pulled high (logic 1) through resistor 74. The output of the inverter 72 will be low (logic 0). When the slit valve closed sensor 42 is activated (closed), the input to inverter 72 is pulled low (logic 0) by the sensor and the output of the inverter 72 will be high (logic 1). Similarly, when slit valve open sensor 38 is not activated (open), the input to a Schmidt-trigger inverter 76 is pulled high (logic 1) through resistor 78. The output of the inverter 76 will be low (logic 0). When slit valve open sensor 38 is activated (closed), the input to inverter 76 is pulled low (logic 0) by the sensor forcing the output of the inverter 76 high (logic 1). The output of inverter 72 is applied to the positive-edge triggered clock input of a D-type flip-flop 80 such as a CD4013B, for example. The output of inverter 76 is applied to the asynchronous active high reset input of D-type flip-flop 80. Resistor 82 functions as a pull-up resistor for the data (D) input of D-type flip-flop 80 maintaining a high logic level on the data (D) input at all times. The Q output of the D-type flip-flop 80 is tied to a pair of cascaded Schmidt-trigger inverters 84 and 86 functioning together as a buffer. The output of the second inverter 86 drives the base of NPN transistor 90 through base current limiting resistor 88. The NPN transistor 90 drives relay coil 92. A flyback diode 94 is placed across relay coil 92 to prevent high voltage transients during coil de-energizing.

Referring still to FIGS. 2 and 3, the door 30 closing sequence is now described. When the slit valve door 30 is open, the slit valve closed sensor 42 is not activated (open) and slit valve open sensor 38 is activated (closed). The reset input to the D-type flip-flop 80 is high (logic 1) resetting the output of the D-type flip-flop 80 to a low (logic 0). In this case, NPN transistor 90 is off, relay coil 92 is not energized and normally closed contacts 96 associated with relay coil 92 are closed. The speed change sensor 40 is not activated (open). NPN transistor 78 is off, relay coil 64 is not energized and normally open contacts 66 associated with relay coil 64 are open. Solenoid valve actuator coil 98 is not energized, and solenoid valve 36 is open allowing closure of the door 30 with full pressure of between about 70 and 95 psi and speed. Prior to activation of speed change sensor 40, this state will remain even after the slit valve door 30 begins closing and the slit valve open sensor 38 becomes deactivated (open).

Continuing the closure sequence, when the door 30 reaches the position where the speed change sensor 40 is activated (closed), the output of Schmidt-trigger inverter 58 will be high (logic 1). NPN transistor 62 will be turned on and relay coil 64 will be energized. Normally open contacts 66 associated with relay coil 64 will close energizing relay coil 98. This causes normally open contacts 97 associated with relay coil 98 to close thereby latching relay coil 98. In addition, energizing relay coil 98 also closes solenoid valve 36. This reduces the pressure applied to the door 30 and slows the door 30 closure speed. Since the relay coil 98 is latched on, the door 30 closure speed will continue to be reduced even after the speed change sensor 40 is de-activated. This reduced air pressure preferably between 30 and 40 psi will continue until the closed sensor 42 is activated (closed).

Still continuing the closure sequence, when the door 30 reaches the closed position, closed sensor 42 will be activated (closed). The output of Schmidt trigger inverter 72 changes from a low to high logic level (0→1) clocking the input of D-type flip-flop 80. The output of D-type flip-flop 80 will become high (logic 1), NPN transistor 90 conducts, relay coil 92 is energized and normally closed contacts 96 associated with relay coil 92 will open. Solenoid valve actuator coil 98 is no longer energized, and solenoid valve 36 will open allowing full pressure between about 70 and 95 psi to be applied to the slit valve door 30 thereby maintaining a tight seal and concluding the closing sequence. Flyback diode 99 is placed across solenoid valve actuator coil 98 to prevent high voltage transients during coil de-energizing.

During the door 30 open sequence, the output of D-type flip-flop 80 will be high, NPN transistor 90 is on, relay coil 92 is energized and normally closed contacts 96 associated with relay coil 92 will remain open even during the period when the speed change sensor 40 is activated. Solenoid valve actuator coil 98 is not energized, and solenoid valve 36 is open allowing full pressure to be used when opening the door 30. Once the door 30 is completely open, open sensor 38 will be activated thereby resetting the output of D-type flip-flop 80 to a logic low (0). The NPN transistor 90 is turned off, relay coil 92 is de-energized and normally closed contacts 96 associated with relay coil 92 close. The opening sequence is finished and the closing sequence may now be repeated.

To summarize, the solenoid valve actuator coil 98 is only energized when normally closed contacts 96 are closed while either normally open contacts 66 are closed or normally open contacts 97 are closed. The solenoid valve coil 98 is only energized during the closure sequence after the speed change sensor 40 is activated and before the closed sensor 42 is activated. This closes the solenoid valve 36 and reduces the pressure to the door 30 slowing the door 30 closing speed. The solenoid valve 36 is open during the entire door 30 opening sequence.

The present invention uses a system designed to control the slit valve door actuator pneumatic pressure and movement during the closing sequence. This results in a soft touch landing or seating of the door and reduces the particles generated by systems incorporating one pressure in the door closure. This will improve the overall IC yield for both production and test wafer lots. With improved test lot wafer yields, smaller test wafer lots can be used. By reducing wear on the door and door seat, fewer parts such as the door, door seat and slit valve O-ring are consumed and both scheduled and unscheduled maintenance times are reduced. In addition, inspection time required for measuring particles is reduced.

While the invention has been particularly shown and described with reference to the preferred embodiments thereof, it will be understood by those skilled in the art that various changes in form and details may be made without departing from the spirit and scope of the invention.

What is claimed is:

1. A slit valve used to isolate vacuum chambers comprising:
    a slit valve door;
    a pneumatic speed controller wherein full pneumatic pressure is applied by bypassing said pneumatic speed controller and wherein less than full pneumatic pressure is applied by activating said pneumatic speed controller; and
    a slit valve controller wherein said slit valve controller activates or bypasses said pneumatic speed controller to control pneumatic pressure applied to said slit valve door during an opening sequence and a closing sequence of said slit valve door.

2. The device according to claim 1 wherein said slit valve controller activates or bypasses said pneumatic speed controller by setting a 3/2 way solenoid valve.

3. The device according to claim 1 wherein said slit valve controller has three sensors indicating the position of said slit valve door comprising:
    an open sensor indicating that said slit valve door is mostly or fully open;
    a closed sensor indicating that said slit valve door is fully closed; and
    a soft landing sensor indicating that said slit valve door is nearly closed.

4. The device according to claim 3 wherein said sensors are reed switches.

5. The device according to claim 3 wherein during said closing sequence of said slit valve door full pneumatic pressure is applied to said slit valve door only when either said open sensor or said closed sensor are activated and said soft landing sensor is not activated.

6. The device according to claim 5 wherein said full pneumatic pressure is between about 70 and 95 psi.

7. The device according to claim 3 wherein during said closing sequence of said slit valve door less than full pneumatic pressure is applied to said slit valve door when said soft landing sensor is activated.

8. The device according to claim 7 wherein said less than full pneumatic pressure is between about 30 and 40 psi.

9. The device according to claim 3 wherein during said opening sequence of said slit valve door full pneumatic pressure is applied to said slit valve door.

10. The device according to claim 9 wherein said full pneumatic pressure is between about 70 and 95 psi.

11. A slit valve used to isolate vacuum chambers comprising:
    a slit valve door;
    three sensors indicating the position of said slit valve door wherein one of said sensors indicates that said slit valve door is mostly or fully open, a second of said sensors indicates that said slit valve door is fully closed, and a third of said sensors indicates that said slit valve door is nearly closed;
    a pneumatic speed controller wherein full pneumatic pressure is applied by bypassing said pneumatic speed controller and wherein less than full pneumatic pressure is applied by activating said pneumatic speed controller; and
    a slit valve controller wherein said slit valve controller activates or bypasses said pneumatic speed controller to control pneumatic pressure applied to said slit valve door during a closing sequence and an opening sequence of said slit valve door.

12. The device according to claim 11 wherein said slit valve controller activates or bypasses said pneumatic speed controller by setting a 3/2 way solenoid valve.

13. The device according to claim 11 wherein said sensors are reed switches.

14. The device according to claim 11 wherein during said closing sequence of said slit valve door full pneumatic pressure is applied to said slit valve door only when said sensor indicating that said slit valve door is nearly closed is not activated.

15. The device according to claim 14 wherein said full pneumatic pressure is between about 70 and 95 psi.

16. The device according to claim 11 wherein during said closing sequence of said slit valve door less than full pneumatic pressure is applied to said slit valve door only when said sensor indicating that said slit valve door is nearly closed is activated.

17. The device according to claim 16 wherein said less than full pneumatic pressure is between about 30 and 40 psi.

18. The device according to claim 11 wherein during said opening sequence of said slit valve door full pneumatic pressure is applied to said slit valve door.

19. The device according to claim 18 wherein said full pneumatic pressure is between about 70 and 95 psi.

20. A method to open and close a slit valve used to isolate vacuum chambers wherein said slit valve comprises:
    a slit valve door;
    three sensors indicating the position of said slit valve door wherein one of said sensors indicates that said slit valve door is mostly or fully open, a second of said sensors indicates that said slit valve door is fully closed, and a third of said sensors indicates said slit valve door is nearly closed;
    a pneumatic speed controller wherein full pneumatic pressure is applied by bypassing said pneumatic speed controller and wherein less than full pneumatic pressure is applied by activating said pneumatic speed controller; and
    a slit valve controller wherein said method comprises:
        controlling pneumatic pressure applied to said slit valve door during slit valve door opening and closing sequences such that during said opening sequence of said slit valve door, said pneumatic speed controller is bypassed so that full pneumatic pressure is applied to said slit valve door and during said closing sequence of said slit valve door, said pneumatic speed controller is bypassed so that full pneumatic pressure is applied to said slit valve door only when said sensor indicating that said slit valve door is nearly open is not activated and said pneumatic speed controller is activated so that less than full pneumatic pressure is applied to said slit valve door only when said sensor indicating that said slit valve door is nearly closed is activated.

21. The method according to claim 20 wherein said slit valve controller activates or bypasses said pneumatic speed controller by setting a 3/2 way solenoid valve.

22. The method according to claim 20 wherein said sensors are reed switches.

23. The method according to claim 20 wherein said full pneumatic pressure is between about 70 and 95 psi.

24. The method according to claim 20 wherein said less than full pneumatic pressure is between about 30 and 40 psi.

\* \* \* \* \*